US012785556B2

(12) United States Patent
Krogsgaard

(10) Patent No.: US 12,785,556 B2

(45) Date of Patent: Nov. 3, 2026

(54) EAR LEVEL AUDIO DEVICE AND A METHOD OF OPERATING AN EAR LEVEL AUDIO DEVICE

(71) Applicant: WS AUDIOLOGY A/S, Lynge (DK)

(72) Inventor: Klaus Krogsgaard, Frederikssund (DK)

(73) Assignee: WS Audiology A/S, Lynge (DK)

( * ) Notice: Subject to any disclaimer, the term of this patent is extended or adjusted under 35 U.S.C. 154(b) by 220 days.

(21) Appl. No.: 18/283,623

(22) PCT Filed: Mar. 23, 2022

(86) PCT No.: PCT/EP2022/057644
§ 371 (c)(1),
(2) Date: Sep. 22, 2023

(87) PCT Pub. No.: WO2022/200436
PCT Pub. Date: Sep. 29, 2022

(65) Prior Publication Data

US 2024/0171071 A1 May 23, 2024

(30) Foreign Application Priority Data

Mar. 24, 2021 (DK) ............................. PA202100296

(51) Int. Cl.
*H02M 3/156* (2006.01)
*H04R 25/00* (2006.01)

(52) U.S. Cl.
CPC ............ *H02M 3/156* (2013.01); *H04R 25/30* (2013.01); *H04R 2225/33* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS 7,482,866 B2 * 1/2009 Wu ......................... H03F 1/305
330/297
9,344,812 B2 * 5/2016 Krogsgaard ......... H04R 1/1025
(Continued)

FOREIGN PATENT DOCUMENTS

DE 197 02 151 A1 7/1998
DE 10 2018 222 016 A1 12/2019
(Continued)

OTHER PUBLICATIONS

International Search Report for PCT/EP2022/057644, dated Aug. 2, 2022.
Written Opinion for PCT/EP2022/057644, dated Aug. 2, 2022.

*Primary Examiner* — Jeffrey A Gblende
(74) *Attorney, Agent, or Firm* — Sughrue Mion, PLLC

(57) ABSTRACT

An ear audio device (100) with improved power management and a method (200) of operating such an ear level, audio device.

18 Claims, 2 Drawing Sheets

(58) Field of Classification Search

CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069; H04R 25/00; H04R 25/30; H04R 2225/33; H04R 2225/00

See application file for complete search history.

(56) References Cited

U.S. PATENT DOCUMENTS

| | | | | |
|---|---|---|---|---|
| 10,264,371 | B2 | 4/2019 | Larsen et al. | |
| 10,530,248 | B2 | 1/2020 | Larsen et al. | |
| 10,575,106 | B1 * | 2/2020 | Bergmann | H04R 25/505 |
| 11,445,318 | B2 * | 9/2022 | Khaleghimeybodi | H04R 1/1091 |
| 2010/0148867 | A1 * | 6/2010 | Chen | H03F 1/0211<br>330/199 |
| 2015/0189448 | A1 * | 7/2015 | Siegumfeldt | H04R 25/602<br>381/323 |

FOREIGN PATENT DOCUMENTS

| | | | | |
|---|---|---|---|---|
| EP | 1 367 702 | A1 | 12/2003 | |
| EP | 1 519 622 | A2 | 3/2005 | |
| EP | 2 540 097 | A1 | 1/2013 | |
| EP | 2 696 488 | A1 | 2/2014 | |
| EP | 2 890 155 | A1 | 7/2015 | |
| WO | 01/50812 | A1 | 7/2001 | |
| WO | WO-03026348 | A1 * | 3/2003 | G06F 1/3203 |
| WO | 2013/087118 | A1 | 6/2013 | |

* cited by examiner

EAR LEVEL AUDIO DEVICE AND A METHOD OF OPERATING AN EAR LEVEL AUDIO DEVICE

CROSS REFERENCE TO RELATED APPLICATIONS

This application is a National Stage of International Application No. PCT/EP2022/057644 filed Mar. 23, 2022, claiming priority based on Demark Patent Application No. PA202100296 filed Mar. 24, 2021.

FIELD OF THE INVENTION

The present invention relates to an ear level audio device. Further, the present invention relates to a method of operating such an ear level audio device.

BACKGROUND OF THE INVENTION

Within the context of the present disclosure an ear level audio device should be understood as a small, battery-powered, microelectronic device designed to be worn in or at an ear of a user. The ear level audio device generally comprises a power source such as a battery (that may be rechargeable) or a fuel cell, at least one microphone, a microelectronic circuit comprising a digital signal processor, and an acoustic output transducer. The ear level audio device is enclosed in a casing suitable for fitting in or at (such as behind) a human ear.

If the ear level audio device furthermore is capable of amplifying an ambient sound signal in order to alleviate a hearing deficit the ear level audio device may be considered a personal sound amplification product or a hearing aid.

According to variations the mechanical design of an ear level audio device may resemble those of hearing aids and as such traditional hearing aid terminology may be used to describe various mechanical implementations of ear level audio devices that are not hearing aids. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In more recent types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids or Invisible-In-Canal (IIC). This type of hearing aid requires an especially compact design in order to allow it to be arranged in the ear canal, while accommodating the components necessary for operation of the hearing aid.

Other types of hearing aids include cochlear implants and bone conducting hearing aids. Other ear level audio devices that resemble hearing aids are e.g. devices for the treatment of tinnitus and devices for relieving stress and anxiety.

A range of standard batteries such as e.g. batteries of the Zn-air type are suitable for powering an ear level audio device according to the invention. However, e.g. Zn-air batteries may be considered less environmentally friendly because they are not re-chargeable and contain mercury.

Many contemporary ear level audio devices are therefore configured to use rechargeable Lithium-ion (Li-ion) batteries that inherently provide an output voltage of around 3.5 Volts which is too high for directly supplying at least some of the digital electronics comprised in some types of contemporary ear level audio device, such as hearing aids.

EP-A1-2890155 discloses a hearing instrument which comprises a microphone comprising a microphone transducer element mounted in a microphone housing. The microphone transducer element produces a transducer signal in response to receipt of sound and a microphone amplification circuit is configured to generate an amplified microphone signal from the transducer signal. A control and processing circuit of the hearing instrument is coupled to the microphone amplification circuit for receipt and processing of the amplified microphone signal according to a hearing loss of a user.

The microphone amplification circuit has a power supply port coupled to a switchable power supply which is selectively connected to a first power supply voltage, having a first DC voltage level, or a second power supply voltage, having a second DC voltage level, to the power supply port of the microphone amplification circuit. The second DC voltage level is higher than the first DC voltage level. A level detector is configured to detect a level of a microphone signal and connect the first or the second power supply voltage to the power supply port based on the detected level of the microphone signal.

EP-A1-2540097 discloses a power management system, for a digital processing core of a battery-powered hearing aid that is adapted for providing power to the hearing aid circuit in a particularly efficient manner. The power management system comprises a first linear voltage regulator, and a second linear voltage regulator in series with a switched-capacitor (SC) 2:1 converter, a positive bulk biasing voltage supply, and a negative bulk biasing voltage supply, for controlling the switching speed, threshold voltage, and current leak from the semiconductor elements of the digital processing core when the core is operated at the reduced voltage provided by the power management system. The power management system may save between 50% and 70% of the power consumed by the digital processing core of the hearing aid circuit when compared to existing hearing aids and may thus prolong the battery life. The invention further provides a method for providing a supply voltage to a digital hearing aid.

US-B2-10530248 discloses a head-wearable hearing device comprising a multiple-output switched capacitor DC-DC converter. Said multiple-output switched capacitor DC-DC converter comprises a switch matrix comprising a plurality of individually controllable semiconductor switches and a plurality of flying capacitors connected between respective sets of circuit nodes of the switch matrix. A controller is connected to respective control terminals of the plurality of individually controllable semiconductor switches of the switch matrix to configure first and second converter sections to form first and second converter topologies, respectively.

US-B2-10264371 discloses a hearing instrument comprising a rechargeable battery source providing a battery supply voltage and a switched capacitor DC-DC converter comprising a DC input coupled to the battery supply voltage for converting the battery supply voltage into a higher or lower DC output voltage. The hearing instrument comprises at least one active circuit connected to the DC output voltage for energizing active components of the at least one active circuit.

However, the prior art is not optimum at least with respect to efficiency and flexibility of the power management (i.e. the power supply and the associated control system).

It is therefore a feature of the present invention to provide an ear level audio device with improved power management.

It is another feature of the present invention to provide a method of operating an ear level audio device with improved power management.

SUMMARY OF THE INVENTION

The invention in a first aspect provides an ear level audio device according to claim 1.

This provides an ear level audio device with improved power management.

The invention in a second aspect provides a method of operating an ear level audio device with improved power management according to claim 8.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

In the present context the term digital input signal may be used interchangeably with the term input signal and the same is true for all other signals referred to in that they may or may not be specifically denoted as digital signals.

In the present context the terms "preferred power supply rail voltage level" and "preferred regulated power supply voltage level" may be used interchangeably. Similarly, the terms "power supply voltage" and "power supply voltage level" may be used interchangeably.

Figure 1:
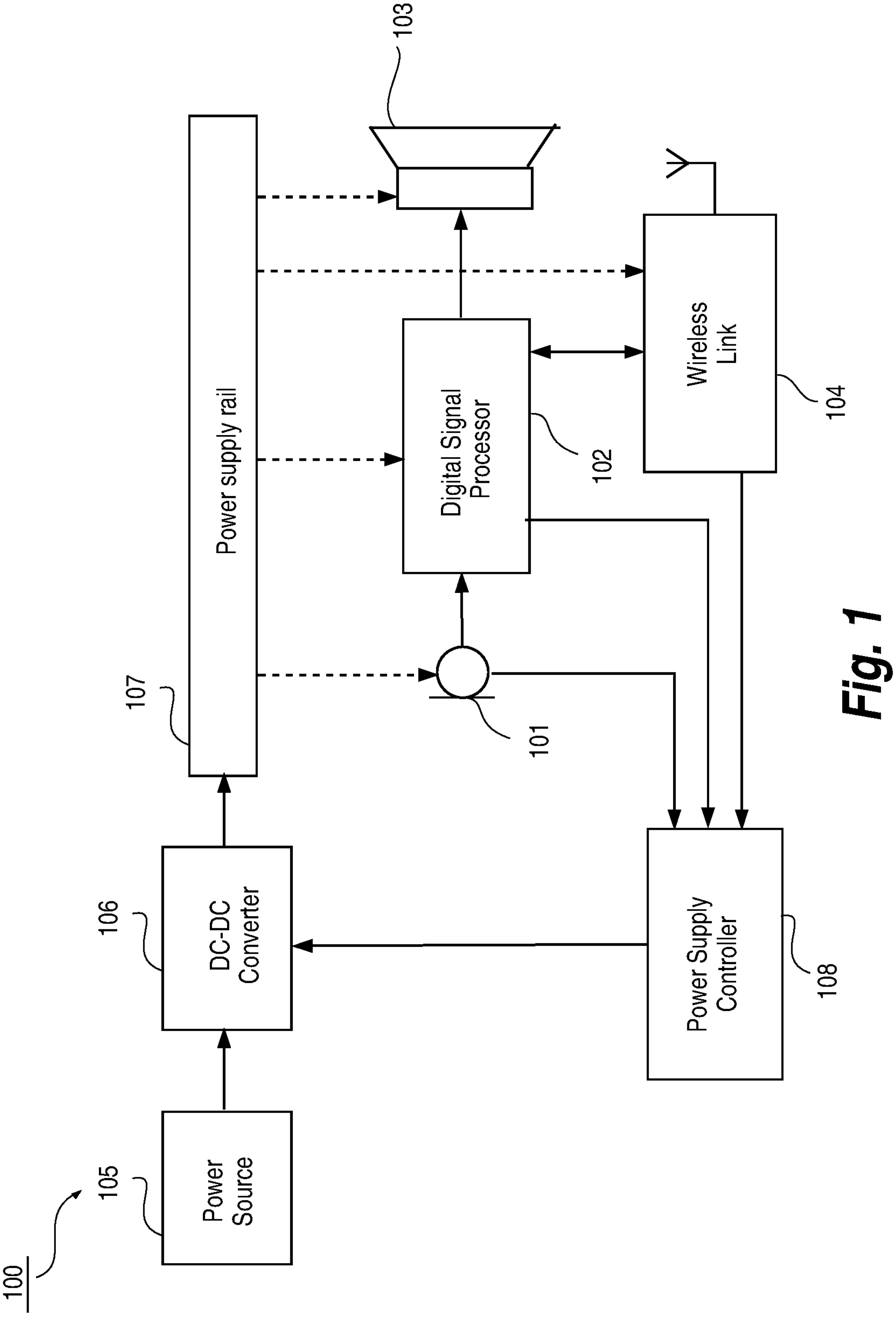
FIG. 1 illustrates highly schematically an ear level audio device according to an embodiment of the invention.

In the present context the term "headset mode" represent a mode where an ear level audio device functions as a headset using a (typically wireless) link to a second device (which may also be denoted an external device), e.g. the user's phone. Thus "headset mode" represents streaming of audio (either uni-directional or bi-directional) between the ear level audio device and the second device. Consequently a "remote control mode", wherein said (typically wireless) link is used to at least partly (remote) control the audio device from an external device such as the user's phone is not a "headset mode". Reference is first made to FIG. 1, which highly schematically illustrates an ear level audio device 100 according to an embodiment of the invention. The ear level audio device 100 comprises an acoustical-electrical input transducer 101, i.e. a microphone, a digital signal processor (DSP) 102 and an electro-acoustical output transducer, i.e. the hearing aid speaker 103. The microphone 101 provides an analog input signal that is converted into a digital input signal by an analog-digital converter (not shown for reasons of clarity). The digital input signal is processed by the DSP 102 in order to suppress noise or alleviate an individual hearing deficit and the resulting processed signal is subsequently provided to a digital-analog converter (not shown for reasons of clarity) and further on to the acoustical-electrical output transducer 103 for conversion of the processed signal into sound.

According to an embodiment, the DSP 102 is adapted to improve speech intelligibility or reduce noise or both in addition to being adapted to alleviating an individual hearing deficit. In further variations the DSP 102 is not adapted to alleviate an individual hearing deficit and instead directed only at reducing noise and/or improving speech intelligibility.

According to an embodiment the digital signal processor comprises a time-varying filter adapted to provide a specific frequency dependent target for at least one of suppressing noise, improving speech intelligibility and alleviating an individual hearing deficit.

According to a not shown embodiment the digital input signal is branched, whereby the input signal, in a first branch, is provided to the DSP 102 and, in a second branch, is provided to an analysis filter bank configured to split the input signal into a multitude of frequency band signals that are subsequently provided to a target gain calculator that derives a frequency dependent target gain and, in case the digital signal processor comprises a time-varying filter, subsequently derives corresponding filter coefficients for the time-varying filter.

According to an embodiment, the analysis filter bank 107 is implemented in the time-domain and in another embodiment, the analysis filter bank is implemented in the frequency domain using e.g. Discrete Fourier Transformation.

According to an embodiment the digital-analog converter (not shown) is implemented as a sigma-delta converter, e.g. as disclosed in EP-B1-793897. However, in the following the terminology digital-analog converter is used independent of the chosen implementation.

Furthermore, the ear level audio device 100 comprises a power supply source, in the form of re-chargeable Li-ion battery 105, an inductive DC-DC converter 106, a power supply rail 107, a DC-DC controller 108 and a wireless link 104.

The power supply source 105 provides an output voltage that is converted to a regulated power supply voltage by the inductive DC-DC converter 106 and provided to the power supply rail 107 (in the following the terms "regulated power supply voltage" and "regulated power supply rail voltage" or simply "power supply rail voltage" may therefore be used interchangeably), wherefrom power is drawn for various ear level audio device components including at least one of the acoustical-electrical input transducer 101, the digital signal processor (DSP) 102, the hearing aid speaker 103 and the wireless link 104 as indicated by the dotted arrows in FIG. 1. The level of the output voltage provided by the inductive DC-DC converter 106 (i.e. the regulated power supply voltage level) is controlled by the DC-DC controller 108, which is adapted to receive status information (which in the following may also be denoted monitoring) from at least some of the ear level audio device components including at least one of the acoustical-electrical input transducer 101, the digital signal processor (DSP) 102, the hearing aid speaker 103 and the wireless link 104. Hereby the level of the regulated power supply rail voltage, which is provided from the DC-DC converter 106 and to the power supply rail 107 can be controlled by the ear level audio device 100 through the DC-DC controller 108.

Thus, the DC-DC controller 108 generally monitors whether a specific criterium representing a specific operating situation of the ear level audio device is fulfilled and in the affirmative a corresponding regulated power supply voltage level is provided by the DC-DC converter 106.

According to a more specific embodiment the power supply rail 107 is connected to the associated Digital-Analog Converter (DAC), rather than to the speaker as such. Thus, in the following the normally used term speaker may be construed to also include the associated DAC.

According to an embodiment the power supply source 105 is not of the Li-ion type and according to another embodiment the power supply source 105 is not of the rechargeable type.

According to an embodiment the wireless link 104 is Bluetooth Low Energy (BLE) transceiver.

It is noted that an inductive DC-DC converter is advantageous over e.g. a capacitive DC-DC converter because it is low output impedance as a result of the negative feedback of the control loop, and as such reduces the variations in power supply rail voltage (e.g. due to the BLE transceiver being active) which would otherwise couple into e.g. the acoustical-electrical output transducer 103.

According to an especially advantageous embodiment the wireless link 104 is adapted to allow operation in a specific headset mode and the DC-DC controller 108 is adapted to control the DC-DC converter 106 such that the level of the power supply rail voltage is increased when the headset mode is active, whereby the link quality especially is improved for the transmission of wireless signals from the ear level audio device and to the user's phone. However, when the ear level audio device is not operating in headset mode the DC-DC converter 106 is generally controlled to lower the level of the power supply rail voltage (unless other circumstances require otherwise—as will be discussed further below).

In this manner an unnecessary high power supply rail voltage needs not be maintained when the ear level audio device 100 is not operated in headset mode and consequently the life of the power supply source (i.e. the battery life) can be prolonged accordingly.

According to a more specific embodiment the level of the power supply rail voltage is 1.5V when the wireless link 104 is operated in headset mode, whereby the link quality between the ear level audio device and phone can be improved as a result of the higher transmit power. However, in variations said power supply rail voltage may be in the range between 1.4-1.6 V or in the range between 1.25-1.65 V.

According to an alternative and more specific embodiment the power supply rail voltage is not elevated continuously while the ear level device is operated in headset mode but only just-in-time, i.e., only for the durations of each transmit data package with sufficient timing to allow for ramp-up and ramp-down of the power supply rail before and after the transmission, respectively.

The inventor has realized that it is especially advantageous to elevate the power supply rail voltage in connection with operating the audio device in headset mode because the higher voltage can alleviate the need for packet re-transmissions, which is critical for keeping the transmission delay sufficiently low (since the use of data package re-transmission may add say between 20 and 30 milliseconds of delay) and hereby obtaining a high quality headset functionality. According to a more specific embodiment the elevated power supply rail voltage, when operating in headset mode, is combined with packet loss concealment techniques.

According to an embodiment the level of the power supply rail voltage is also (or alternatively) increased in response to the wireless link 104 initiating reception or transmission of relatively large amounts of data independent on this being the result of the ear level audio device operating in headset mode. According to a more specific embodiment the power supply rail voltage is increased in response to the wireless link 104 initiating reception of relatively large amounts of data, e.g. as a result of carrying out an audio device firmware update.

According to an embodiment the just-in-time principle for elevating the power supply rail voltage is also applied for these (not headset mode associated) wireless data transmissions.

According to yet another embodiment the power supply rail voltage level is increased in situations where high Sound Pressure Levels (SPL) (input and/or output) is desired/expected, hereby both the maximum input and output SPL may be increased and hereby also the signal-to-noise ratio may be improved for the ear level audio device.

According to a more specific embodiment the DC-DC converter 106 is controlled to provide that the power supply rail voltage is elevated to a level in the range between 1.25-1.65 V or in the range between 1.3-1.6 V in response to an identification of a sound environment with a SPL above a first threshold level or in response to identifying that a SPL above a second threshold level is to be provided.

According to further specific embodiments said first and second threshold levels are selected to be in the range between 6 and 20 dB lower than the corresponding (i.e. input or output) maximum SPL that the ear level audio device can handle. Thus, for SPL's more than 6 dB lower than the maximum SPL it will not be required to provide an elevated power supply rail voltage. On the other hand, if either the input or the output SPL is less than 6 dB smaller than the maximum SPL, then the sound environment will be characterized as a high sound pressure level environment.

According to still another embodiment the DC-DC converter 106 is controlled (again by the DC-DC controller 108) to provide an elevated power supply rail voltage in response to an identification that an adjustable vent actuator is active (as will be obvious for the person skilled in the art it is emphasized that when reference is made to the operating situation where an adjustable vent actuator is characterized as being active, then reference is in fact made to the operating situation (or point in time) where the audio device has determined that the adjustable vent actuator is about to be activated. According to a more specific embodiment the DC-DC converter 106 is controlled to provide that the power supply rail voltage is elevated to a level in the range between 1.3-1.6 V or in the range between 1.25-1.65 V Finally, according to the present embodiment and its variations, the power supply rail voltage level can be kept in the range between 1.0-1.3 V, or between 1.05-1.15 V during periods with only basic functionality thereby reducing power consumption and thus maximizing battery (i.e. power supply source) runtime.

According to a more specific embodiment the identification (which may also be denoted characterization) of the ear level audio device operating using only basic functionality is based on at least one of operating in a sound environment that is not characterized as a high sound pressure level environment, based on not operating in headset mode and based on not having an active adjustable vent actuator.

According to an embodiment, if the audio device fulfills more than one of the criteria used to identify a specific operating situation, then the power supply rail voltage level is selected to be in the range with the highest levels. However, according to a variation of this embodiment, the range is determined by combining the ranges representing each of the fulfilled criteria in some other way.

According to another more specific embodiment the DC-DC controller is adapted to carry out at least two of the tasks selected from the group of tasks comprising: monitoring whether a headset mode is active, monitoring whether an adjustable vent actuator is active, monitoring whether the current sound environment is a high sound pressure level environment and monitoring whether the audio device is operating using only basic functionality.

According to an even more specific embodiment said two tasks are monitoring of the headset mode and monitoring of whether the audio device is operating using only basic functionality. Which is especially advantageous in enabling both reduced power consumption and improved headset functionality. Obviously, the task of monitoring a specific operating situation comprises in the context of the previous paragraph the step of identifying such a specific operating situation. According to an alternative embodiment the preferred inductive DC-DC converter may be replaced by a charge pump adapted to provide either a 2:1 or 3:1 conversion ratio dependent on the circumstances. More specifically a conversion ratio of 2:1 is selected when e.g. headset mode is active and a conversion ratio of 3:1 when the ear level audio device is in basic mode. In case the power supply source is a re-chargeable Li-ion battery this will provide a power supply rail voltage in the range between say 1.05 and 1.4V and in the range between say 1.6-2.1V for conversion ratio of 3:1 and 2:1 respectively. Thus according to an even more specific embodiment a Low Drop Out (LDO) regulator can be adapted to ensure that the wireless link (in contemporary audio devices typically a BLE transceiver chip) is not provided with a voltage above say 1.8 V.

According to another alternative embodiment the preferred inductive DC-DC converter may be replaced by a less preferred capacitive DC-DC converter if implemented such that the conversion ratio is dynamically controlled, but it is noted that only an approximately constant voltage may be achieved because of the dependence of the input voltage. Furthermore, as already mentioned above a capacitive DC-DC converter is disadvantageous in the present context compared to the preferred inductive DC-DC converter because of its higher impedance.

According to yet another specific embodiment the ear level audio device is adapted to maintain a relative low power supply rail voltage even in an operating situation that will normally require a higher voltage for some specific feature in order to avoid undesired oscillation between normal mode of operation and a mode of operation where at least some functions are disabled (which may also denoted "brown" mode). Examples of such an operating situation may be when the ear level audio device is adapted to (normally) provide a peak SPL from the loudspeaker (which may also be denoted a receiver if the audio device is a hearing aid) or when the ear level audio device is operating in a sound environment with a high average SPL. In these operating situations it may normally be required to increase the power supply rail voltage in order to provide e.g. an additional 6 dB SPL from the loudspeaker. Thus by maintaining the low power supply rail voltage in these situations e.g. peak SPL is sacrificed in order to avoid too frequent oscillation (and consequently hereby avoiding distortion of the delivered sound) between normal mode of operation and "brown" mode of operation.

According to another specific embodiment a second inductive DC-DC converter is accommodated in the ear level audio device in order to down convert the power supply rail voltage, because this generally will vary dependent on the specific operating situation as explained above and as such an inductive DC-DC converter will be advantageous by being able to provide a second regulated voltage in the range between 0.5-0.65 V in order to power the digital signal processor of the audio device or at least some e.g. specific digital logic blocks of the digital signal processor.

However, according to another embodiment the ear level audio device comprises only one inductive DC-DC converter, and some other DC-DC converter such as a capacitive DC-DC converter that generally is advantageous with respect to size.

However, according to another embodiment the ear level audio device comprises in addition to one inductive DC-DC converter as already described, a second DC-DC converter or a linear regular configured in order to power the digital signal processor of the audio device with a constant voltage independent on the power supply rail voltage provided by the inductive DC-DC converter.

According to a specific embodiment the inductive DC-DC converter is operated using Pulse Width Modulation, which is well suited to provide a power supply rail voltage that can be selected with high speed and high resolution, wherefrom high stability of the power supply rail voltage can be achieved Furthermore PWM is advantageous over other types of modulation because PWM has a fixed switching frequency, while the others have varying frequency as a function of input/output voltage and/or current loading. This enables the PWM switching frequency to be selected so that interference of/from other processing blocks such as wireless transceivers may be minimized and maintain this optimum switching frequency across operating conditions. This may especially be advantageous in order to avoid interference from/to wireless systems based on magnetic induction.

Figure 2:
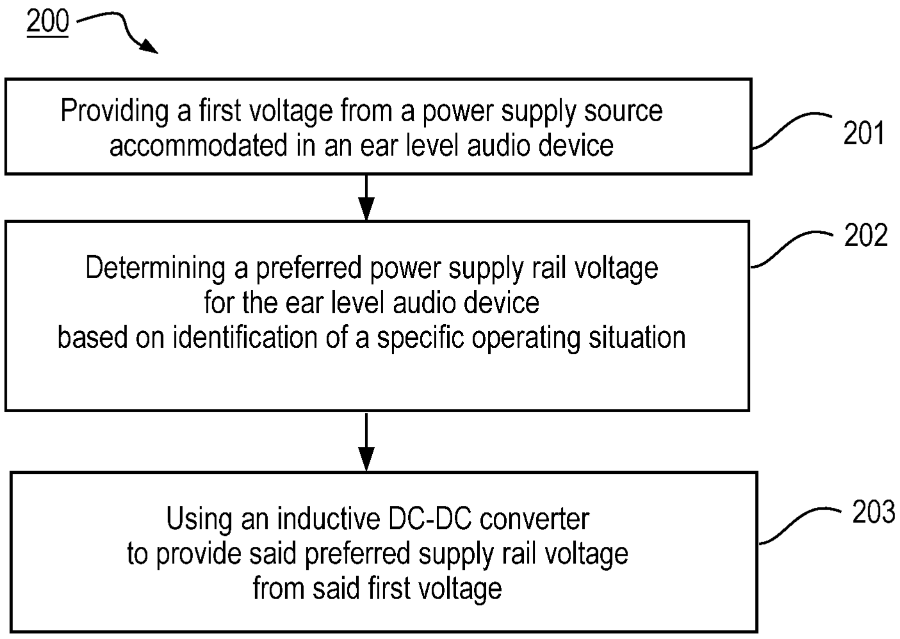
FIG. 2 illustrates highly schematically a method of operating an ear level audio device according to an embodiment of the invention

Reference is now given to FIG. 2, which illustrates highly schematically a method (200) of operating an ear level audio device according to an embodiment of the invention comprising the steps of:

providing, in a first step 201 a first voltage from a power supply source accommodated in the ear level audio device, determining, in a second step 202, a preferred power supply rail voltage level of the ear level audio device based on identification of a specific operating situation for the ear level audio device, and using, in a third step 203, an inductive DC-DC converter to provide said preferred power supply rail voltage from said first voltage.

It is known in the art to have a DC-DC converter with two different output voltages or maybe even two different DC-DC converters, but this is considered less advantageous solutions because the inductive DC-DC converter can be easily (and in a cost effective manner) controlled by any hearing aid signal processor, and because a single DC-DC converter (as opposed to e.g. two converters) is generally advantageous with respect to both current consumption and size, and because the inductive DC-DC converter inherently has a low impedance.

Furthermore it is noted that the inductive DC-DC converter through its ability to provide a regulated power supply output voltage can enable that the level of the provided power supply output voltage depends on at least one specific operating condition and it is also noted that the inductive DC-DC converter can be adapted to provide regulated power supply output voltages in the range between say 1.0 V-1.7 V or between 1.1 V-1.5 V and within these ranges a satisfactory resolution of the provided voltage level may likewise be obtained.

Additionally, it is noted that this flexibility of the inductive DC-DC converter also enables the same processing circuit to be used independent on the type of output transducer (i.e. loudspeaker) used by the ear level audio device, despite that different types of output transducers typically will require different voltage levels for optimum operation.

It is emphasized that the combination of the inductive DC-DC converter and the power supply rail provides a simple circuit architecture that is advantageous with respect to size (and hereby cost) and complexity because only a single DC-DC converter is necessary and because the common regulated power supply rail is sufficient to feed at least the most important audio device components as a result of the flexible inductive DC-DC converters ability to change the level of the regulated power supply rail voltage dependent on the tasks to be carried out by the audio device.

It is likewise emphasized that using the inductive DC-DC converter to provide a regulated power supply voltage level when headset mode is active is advantageous because it enables a preferred power supply voltage level to be provided independent on the voltage level of the power supply source (105).

It is also noted that the present invention is especially advantageous in case of bi-directional audio streaming compared to only uni-directional audio streaming due to the more strict power ressources available in an audio device compared to a second device (i.e. an external device). It is generally noted that even though many features of the present invention are disclosed in embodiments comprising other features then this does not imply that these features by necessity need to be combined.

As one obvious example the specific use of PWM to operate inductive DC-DC converters is independent on how the DC-DC converter is controlled based on the specific operating situation.

Another example is that the specific range within which the regulated power supply rail voltage is to be selected from (dependent on the criteria being fulfilled) is basically independent on the other features.

It is also noted that the special case where the ear level audio device is a hearing aid may be freely combined with any of the disclosed embodiments.

Other modifications and variations of the structures and procedures will be evident to those skilled in the art.

The invention claimed is:

1. An ear level audio device comprising a power supply source, an inductive DC-DC converter, a power supply rail and a DC-DC controller, wherein the inductive DC-DC converter is adapted to provide a regulated power supply voltage, wherein the power supply rail is configured to receive the regulated power supply voltage and to provide the regulated power supply voltage to a plurality of ear level audio components, and wherein the DC-DC controller is adapted to determine a preferred power supply rail voltage level for the ear level audio device based on identification of a specific operating situation and in response to such an identification control the inductive DC-DC converter to provide the preferred regulated power supply voltage, wherein, in order to determine a preferred power supply rail voltage level and control the inductive DC-DC converter, the DC-DC controller is further adapted to:

(a) receive input signals representing at least two different conditions of the ear level audio device, (b) determine, based on a combination of said input signals, one of a plurality of distinct operating situations, each operating situation corresponding to a different combination of said at least two different conditions; and (c) command the inductive DC-DC converter to provide one of a plurality of different regulated power supply voltage levels, each associated with a respective one of said distinct operating situations, and wherein the at least two of said regulated power supply voltage levels differ and are selected in response to different combinations of said conditions of the ear level audio device.

2. The ear level audio device according to claim 1, wherein said specific operating situation is selected from a group of operating situations comprising: a headset mode being active, a current sound environment is a high sound pressure level environment, an adjustable vent actuator is active, and only basic functionality is active.

3. The ear level audio device according to claim 1, wherein the DC-DC controller is further adapted to carry out at least one task of:

monitoring whether a headset mode is active and in an affirmative control the inductive DC-DC converter to provide the regulated power supply voltage with a level in a range between 1.25V and 1.65V;

monitoring whether the current sound environment has a sound pressure level above a first threshold value and whether a sound with an estimated sound pressure level above a second threshold is to be provided and in case at least one is affirmative control the inductive DC-DC converter to provide the regulated power supply voltage with a level in a range between 1.25 V and 1.65 V;

monitoring whether an adjustable vent actuator is active and in the affirmative control the inductive DC-DC converter to provide the regulated power supply voltage with a level in a range between 1.3V and 1.6V; and monitoring whether only basic functionality is active and in the affirmative control the DC-DC converter to provide the regulated power supply voltage with a level in a range between 1.0V and 1.3V.

4. The ear level audio device according to claim 1, wherein said plurality of ear level audio components are selected from a group comprising a wireless link, an acoustical-electrical input transducer, an electrical-acoustical output transducer, an Analog-Digital Converter, a Digital-Analog converter, a digital signal processor, and an adjustable vent actuator.

5. The ear level audio device according to claim 3, wherein the DC-DC controller is further adapted to carry out at least two of said tasks.

6. The ear level audio device according to claim 1, wherein the inductive DC-DC converter is operated using pulse width modulation.

7. The ear level audio device according to claim 1, wherein the ear level audio device is a hearing aid.

8. The ear level audio device according to claim 1, wherein said specific operating situation is a headset mode being active.

9. The ear level audio device according to claim 1, wherein the DC-DC controller is further adapted to monitor whether a headset mode is active and, when the headset mode is active:

control the inductive DC-DC converter to provide the regulated power supply voltage with a level in a range between 1.25V and 1.65V, or control the inductive DC-DC converter to increase the regulated power supply voltage level with at least 10% relative to a level provided when only basic functionality is active.

10. The ear level audio device according to claim 1, wherein the DC-DC controller is further adapted to monitor whether a current sound environment has a sound pressure level above a first threshold value and whether a sound with an estimated sound pressure level above a second threshold is to be provided and in case at least one is affirmative control the inductive DC-DC converter to provide the regulated power supply voltage with a level in a range between 1.25 V and 1.65 V.

11. The ear level audio device according to claim 1, wherein the at least two different device conditions comprise:

(i) an environmental sound pressure level parameter derived from a microphone signal, and (ii) an operational state parameter indicative of activation of at least one device function selected from a wireless link function or an actuator function.

12. The ear level audio device according to claim 1, wherein the at least two of said regulated power supply voltage levels differ by at least 10%.

13. A method of operating an ear level audio device comprising steps of:

providing a first voltage from a power supply source comprised in the ear level audio device;

determining a preferred power supply rail voltage level for the ear level audio device based on identification of a specific operating situation;

using at least one inductive DC-DC converter to provide said preferred power regulated supply voltage from said first voltage; and wherein, in order to determine a preferred power regulated supply voltage level and control the inductive DC-DC converter, the DC-DC controller:

(d) receives input signals representing at least two different conditions of the ear level audio device, (e) determines, based on a combination of said input signals, one of a plurality of distinct operating situations, each operating situation corresponding to a different combination of said at least two different conditions; and (f) commands the inductive DC-DC converter to provide one of a plurality of different regulated power supply voltage levels, each associated with a respective one of said distinct operating situations, and wherein the at least two of said regulated power supply voltage levels differ and are selected in response to different combinations of said conditions of the ear level audio device.

14. The method according to claim 13, wherein said step of determining a preferred power supply rail voltage comprises at least one further step of:

selecting a power supply rail voltage level in a range between 1.25V and 1.65V in response to an identification of the ear level audio device operating in headset mode;

selecting a power supply rail voltage level in a range between 1.25V and 1.65V in response to an identification of the ear level audio device operating a in high sound pressure level environment;

selecting a power supply rail voltage level in a range between 1.3V and 1.6V in response to an identification of an active adjustable vent actuator;

selecting a power supply rail voltage in a range between 1.0V and 1.3V in response to identification of the ear level audio device operating using only basic functionality.

15. The method according to claim 13, wherein said step of determining a preferred power supply rail voltage further comprises:

selecting a power supply rail voltage level in a range between 1.25V and 1.65V in response to an identification of the ear level audio device operating in headset mode, or increasing the regulated power supply voltage level with at least 10% relative to the level provided when only basic functionality is active in response to an identification of the ear level audio device operating in headset mode.

16. The method according to claim 13, wherein said step of determining a preferred power supply rail voltage further comprises:

selecting a power supply rail voltage level in a range between 1.25V and 1.65V in response to an identification of the ear level audio device operating in a high sound pressure level environment.

17. A non-transitory computer-readable medium comprising instructions which, when executed by a computer, causes the computer to carry out the method of claim 13.

18. An ear level audio device comprising a power supply source, an inductive DC-DC converter, a power supply rail and a DC-DC controller, wherein:

the inductive DC-DC converter is adapted to provide a regulated power supply voltage;

the power supply rail is configured to receive the regulated power supply voltage and to provide the regulated power supply voltage to a plurality of ear level audio components; and the DC-DC controller is adapted to determine a preferred power supply rail voltage level for the ear level audio device based on identification of a specific operating situation and in response to such an identification dynamically control the inductive DC-DC converter to provide the preferred regulated power supply voltage;

wherein, in order to determine a preferred power supply rail voltage level and control the inductive DC-DC converter, the DC-DC controller is further adapted to:

(g) receive input signals representing at least two different conditions of the ear level audio device, (h) determine, based on a combination of said input signals, one of a plurality of distinct operating situations, each operating situation corresponding to a different combination of said at least two different conditions; and (i) command the inductive DC-DC converter to provide one of a plurality of different regulated power supply voltage levels, each associated with a respective one of said distinct operating situations, wherein the at least two of said regulated power supply voltage levels differ and are selected in response to different combinations of said conditions of the ear level audio device, and wherein said specific operating situation is selected from a group of operating situations comprising: a current sound environment is a high sound pressure level environment, an adjustable vent actuator is active, and only basic functionality is active.

* * * * *